(12) United States Patent
Adir et al.

(10) Patent No.: US 7,571,201 B1
(45) Date of Patent: Aug. 4, 2009

(54) METHOD FOR DISTRIBUTED JOINT PSEUDO RANDOM DECISION MAKING

(75) Inventors: Allon Adir, Kiryat Tivon (IL); Gil E. Shurek, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/061,808

(22) Filed: Apr. 3, 2008

(51) Int. Cl.
*G06F 1/02* (2006.01)
(52) U.S. Cl. ..................................... 708/254
(58) Field of Classification Search ............... 708/254; 380/262; 712/28–31; 709/201–203; 714/797
See application file for complete search history.

(56) References Cited

U.S. PATENT DOCUMENTS

| | | | |
|---|---|---|---|
| 5,779,545 A | 7/1998 | Berg et al. | |
| 6,381,629 B1 * | 4/2002 | Lee | 709/201 |
| 7,146,392 B2 * | 12/2006 | Harding et al. | 708/254 |
| 2001/0001616 A1 * | 5/2001 | Rakib et al. | 375/259 |
| 2001/0033662 A1 * | 10/2001 | Nishikawa | 380/262 |
| 2002/0138732 A1 | 9/2002 | Irvin | |
| 2006/0030405 A1 | 2/2006 | Robertson | |

* cited by examiner

*Primary Examiner*—Tan V Mai
(74) *Attorney, Agent, or Firm*—King & Spalding LLP

(57) ABSTRACT

A method for making joint pseudo random decisions in a distributed program comprises providing a common original seed value to a plurality of processes in the distributed program, generating the same sequence of pseudo random numbers for each of said plurality of processes using the common original seed, and using pseudo random numbers in the sequence to make successive joint pseudo random decisions. If a process has to make a pseudo random decision that is not joint, it uses another seed or method.

1 Claim, 3 Drawing Sheets

P1/
$D1 = f(N, S_o)$
10

P2/
$D2 = f(N, S_o)$
11

P3/
$D3 = f(N, S_o)$
12

Joint $D = D1 = D2 = D3 = f(N, S_o)$

| P1/ | P2/ | P3/ |
| --- | --- | --- |
| $D1=f(N,S_o)$ | $D2=f(N,S_o)$ | $D3=f(N,S_o)$ |
| 10 | 11 | 12 |

Joint $D = D1 = D2 = D3 = f(N,S_o)$

FIG. 3

METHOD FOR DISTRIBUTED JOINT PSEUDO RANDOM DECISION MAKING

BACKGROUND OF THE INVENTION

1. Field of the Invention

This invention relates to joint pseudo random decision making in a distributed program.

2. Description of Background

A distributed program involves a plurality of processes running concurrently and accessing shared resources. Some distributed programs must make joint decisions. A decision is a choice between several known alternatives and a joint decision is one in which a plurality of processes make the same decision. A decision can be deterministic, e.g., based on an analysis of some shared data. If a decision is deterministic all processes can arrive at the same decision through analysis of the data. Some communication may be required among the processes to enable all of them to base their decision on the same data.

Some distributed programs make decisions that are pseudo random. A pseudo random decision is one that is made based on a set of data, e.g., a sequence of numbers, that approximates the properties of random numbers. A distributed random test generator is an example of a distributed program that makes pseudo random decisions.

Some distributed programs make joint decisions that are pseudo random. Because a joint decision is to be made, the decision must be the same for each process as well as being pseudo random. A distributed random test generator is an example of a distributed program that makes joint pseudo random decisions.

FIG. 1 shows a conventional method for making joint pseudo random decisions. The method shown in FIG. 1 requires that one process 10 is designated as a "monarch" process. The monarch process P1 10 makes each pseudo random decision D1 and communicates the result of the decision to the other processes P2 11, and P3 12, through unidirectional communication lines 20 and 21. The joint pseudo random decision D is equal to the process P1 10 decision D1. Another conventional method of making joint pseudo random decisions involves the various processes communicating with each other to reach a consensus joint pseudo random decision each time a joint pseudo random decision is required.

The conventional methods for making joint pseudo random decisions suffer from the problem that they require communication and synchronization for each pseudo random decision. Distributed programs incur high costs in performance due to such communications. The conventional methods also require some processes that are ready to make and use the decision to delay until communication and synchronization is completed.

SUMMARY OF THE INVENTION

The shortcomings of the prior art are overcome and additional advantages are provided through the use of a method for making joint pseudo random decisions in a distributed program by providing a common original seed value to a plurality of processes in the distributed program, generating the same sequence of pseudo random numbers for each of said plurality of processes using the common original seed, and using pseudo random numbers in the sequence to make successive joint pseudo random decisions.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, processing cost and speed is saved by solving the problem of costly synchronization and communication performed for each joint decision by providing a technique that does not require communication between processes for each joint pseudo random decision.

BRIEF DESCRIPTION OF THE DRAWINGS

The subject matter which is regarded as the invention is particularly pointed out and distinctly claimed in the claim at the conclusion of the specification. The foregoing and other objects, features, and advantages of the invention are apparent from the following detailed description taken in conjunction with the accompanying drawings in which:

FIG. 3 shows another illustrative example in accordance with the invention.

The detailed description explains the preferred embodiments of the invention, together with advantages and features, by way of example with reference to the drawings.

DETAILED DESCRIPTION OF THE INVENTION

The invention herein relies on the use of a common seed to generate pseudo random numbers for use by processes in making joint pseudo random decisions in a distributed program. An example of a distributed program that requires the generation of joint pseudo random decisions is a distributed test generator.

Figure 1:
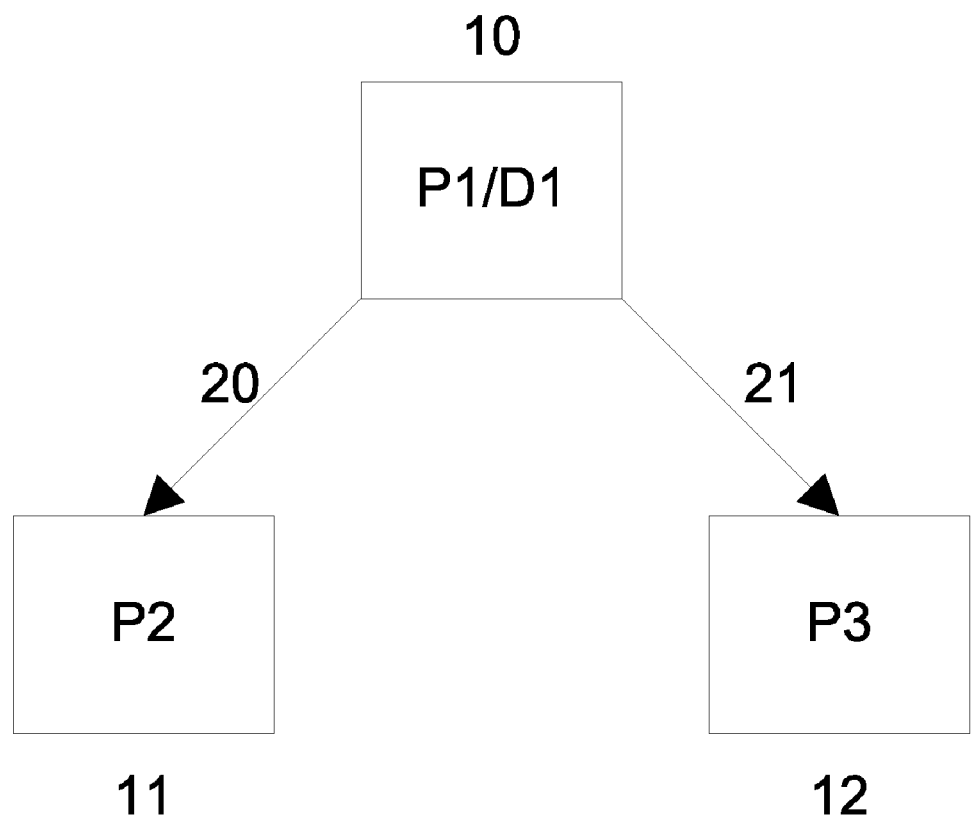
FIG. 1 shows a conventional method of joint pseudo random decision making.
Figure 2:
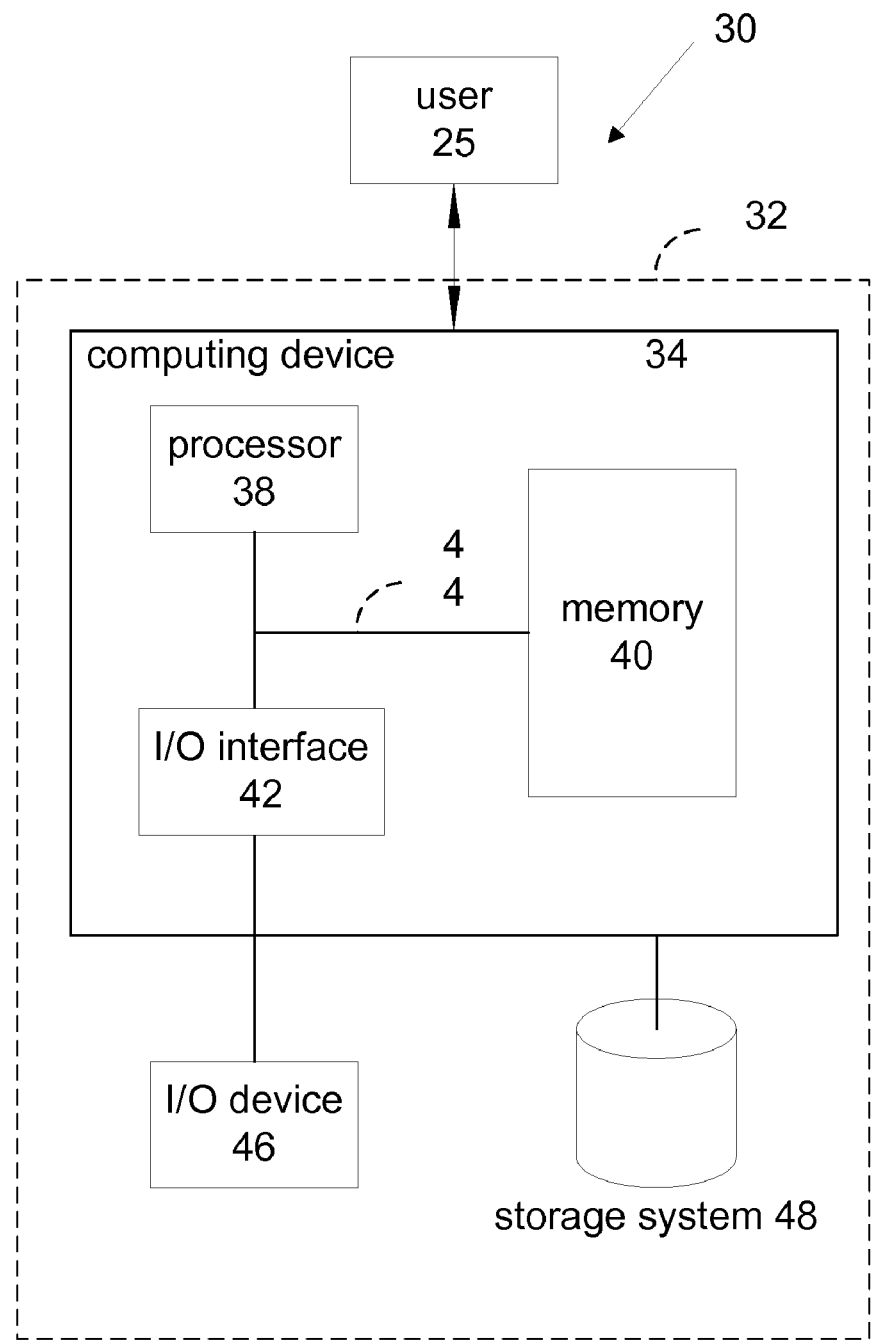
FIG. 2 shows an illustrative example in accordance with the invention.

With reference to the accompanying drawings, FIG. 2 shows an illustrative environment 30 for managing the processes in accordance with the invention. To this extent, the environment 30 includes a computer infrastructure 32 that can perform the processes described herein. In particular, the computer infrastructure 32 is shown including a computing device 34 operable to perform the processes described herein.

The computing device 34 is shown including a processor 38, a memory 40, an input/output (I/O) interface 42, and a bus 44. Further, the computing device 34 is shown in communication with an external I/O device/resource 46 and a storage system 48. As is known in the art, in general, the processor 38 executes computer program code, which is stored in memory 40 and/or storage system 48. While executing computer program code, the processor 38 can read and/or write data, such as the range boundary 50, to/from memory 40, storage system 48, and/or I/O interface 42. The bus 44 provides a communications link between each of the components in the computing device 34. The I/O device 46 can comprise any device that enables an individual to interact with the computing device 34 or any device that enables the computing device 34 to communicate with one or more other computing devices using any type of communications link.

The computing device 34 can comprise any general purpose computing article of manufacture capable of executing computer program code installed thereon (e.g., a personal computer, server, handheld device, etc.). However, it is understood that the computing device 34 is only representative of various possible equivalent computing devices that may perform the processes described herein. Similarly, the computer infrastructure 32 is only illustrative of various types of computer infrastructures for implementing the invention. For example, in one embodiment, the computer infrastructure 32 comprises two or more computing devices (e.g., a server cluster) that communicate over any type of communications link, such as a network, a shared memory, or the like, to perform the process described herein.

FIG. 3 depicts the process according to the invention. When a process that is part of a distributed program wants to make a pseudo random decision, it calls a function to return a pseudo random number. As an example, if a process wants to make a random decision between a fixed set of alternatives 1 to Z, it calls a function GetJointRandomNumber(Z), which returns a pseudo random number from 1 to Z.

The GetJointRandomNumber function can be any random number generator that creates a pseudo random sequence of values based on an original seed $S_0$. The entire sequence of values is determined from the original seed $S_0$. The particular value in the sequence used for any given decision can be represented as a function of a sequence index, N, and the original seed $S_0$, e.g., $f(N,S_0)$. Random number generators utilizing a seed value are well known in the art and the details will not be provided herein.

Referring again to FIG. 3, when a joint decision is required, the processes 10, 11, 12 in the distributed program return a pseudo random number based on the original seed. The function uses a common original seed $S_0$ for each process 10, 11, 12 and thereby returns the same result for D1, D2, and D3. The processes 10, 11, and 12 in the distributed program use the same sequence of numbers for each successive joint pseudo random decision required. These sequences of numbers produced from the common seed are only used for joint decisions. This insures that, for example, when the processes make their Nth joint decision, they are all selecting the Nth pseudo random number in the sequence and making the same decision. If a process has to make a pseudo random decision that is not joint, it uses another seed or method. With this technique, no additional synchronization or timing is required.

There are two alternatives for providing the common original seed $S_0$. In the preferred embodiment, the user provides $S_0$ to the various processes 10, 11, 12 by, for example, compiling the value into shared code. In an alternative embodiment, a single synchronization/communication occurs at the start of the program to agree on a common original seed $S_0$. While this embodiment incurs the costs associated with synchronization, it does so only once. In contrast, the conventional methods incur the cost for each joint pseudo random decision.

Another application of this invention is the situation where a distributed program has certain processes that merely require the knowledge of the pseudo random decisions made by other processes. The invention provides a method for the processes to have that knowledge without communication for each pseudo random decision.

While the preferred embodiments to the invention have been described, it will be understood that those skilled in the art, both now and in the future, may make various improvements and enhancements which fall within the scope of the claim which follows. This claim should be construed to maintain the proper protection for the invention first described.

What is claimed is:

1. A method for making joint pseudo random decisions in a distributed program comprising:

receiving a common original seed value at a plurality of processes in said distributed program, the original seed value provided by a user in computer readable code shared by the plurality of processes;

generating the same sequence of pseudo random numbers for each of said plurality of processes using the common original seed value;

using pseudo random numbers in the sequence to make identical successive joint pseudo random decisions at each of the plurality of processes without a need for communications or synchronization between any of the processes as to the successive joint pseudo random decisions, each process using the same pseudo random number; and making non-joint pseudo random decisions at each of the plurality of processes using pseudo random numbers from sequences of pseudo random numbers generated using seeds having different values than the common seed, wherein the distributed program is implemented in a computing device that comprises instructions stored in a machine-readable medium and a processor that executes the instructions.

* * * * *